(12) United States Patent
Zhang (10) Patent No.: US 10,349,408 B2
(45) Date of Patent: Jul. 9, 2019

(54) COMMUNICATION METHOD, BASE STATION, AND TERMINAL

(71) Applicant: Huawei Technologies Co., Ltd., Shenzhen (CN)

(72) Inventor: Qizhi Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 51 days.

(21) Appl. No.: 15/131,905

(22) Filed: Apr. 18, 2016

(65) Prior Publication Data

US 2016/0234845 A1    Aug. 11, 2016

Related U.S. Application Data

(63) Continuation of application No. PCT/CN2013/085444, filed on Oct. 18, 2013.

(51) Int. Cl.
*H04W 48/16* (2009.01)
*H04W 72/04* (2009.01)
(Continued)

(52) U.S. Cl.
CPC ....... *H04W 72/0453* (2013.01); *H04L 5/0005* (2013.01); *H04L 5/0048* (2013.01);
(Continued)

(58) Field of Classification Search
None
See application file for complete search history.

(56) References Cited

U.S. PATENT DOCUMENTS

2010/0110929 A1    5/2010  Li et al.
2010/0190459 A1*   7/2010  Li ................. H03G 3/3078
                                            455/234.1

(Continued)

FOREIGN PATENT DOCUMENTS

CN    102859925 A     1/2013
JP    2012507974 A    3/2012
WO    2013108219 A1   7/2013

OTHER PUBLICATIONS

ASUSTeK—Method of resource allocation for D2D discovery, Oct. 7-11, 2013, 3GPP TSG RAN WG1 Meeting #74bis, R1-134638.*

(Continued)

*Primary Examiner* — Brandon M Renner
*Assistant Examiner* — The Hy Nguyen
(74) *Attorney, Agent, or Firm* — Leydig, Voit & Mayer, Ltd.

(57) ABSTRACT

A communication method, a base station, and a terminal, which are applied to the communications field, to resolve a problem in the prior art that the terminal cannot obtain a frequency-time pattern of a discovery time period when an interval between two consecutive discovery time periods is long. The method includes: generating, by a base station, an identifier of a current discovery frame of a current discovery time period; and broadcasting, by the base station, the identifier of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

12 Claims, 4 Drawing Sheets

(51) Int. Cl.
H04L 5/00 (2006.01)
H04W 72/00 (2009.01)
(52) U.S. Cl.
CPC ........... H04L 5/0091 (2013.01); H04W 48/16 (2013.01); H04W 72/005 (2013.01)

(56) References Cited

U.S. PATENT DOCUMENTS

| | | | |
|---|---|---|---|
| 2011/0268101 A1 | 11/2011 | Wang et al. | |
| 2012/0269250 A1 | 10/2012 | Li et al. | |
| 2013/0268654 A1* | 10/2013 | Abraham | H04W 40/246 709/224 |
| 2015/0092710 A1* | 4/2015 | Novlan | H04W 72/1278 370/329 |
| 2015/0245192 A1* | 8/2015 | Wu | H04W 8/005 370/329 |
| 2016/0014774 A1* | 1/2016 | Seo | H04W 76/14 370/336 |

OTHER PUBLICATIONS

Nokia—D2D Discovery Signal Considerations, Aug. 19-23, 2013, 3GPP TSG_RAN WG1 Meeting #74, R1-133498.*
"Initial Views on Unified Approach for D2D Discovery," 3GPP TSG RAN WG1 Meeting #73, Fukuoka, Japan, R1-132371, 3$^{rd}$ Generation Partnership Project, Valbonne, France (May 20-24, 2013).
"Views on D2D discovery design," 3GPP TSG RAN WG1 Meeting #74, Barcelona, Spain, R1-133032, 3$^{rd}$ Generation Partnership Project, Valbonne, France (Aug. 19-23, 2013).
"D2D Discovery Signal," 3GPP TSG-RAN WG1 Meeting #74bis, Guangzhou, China, R1-134538, 3$^{rd}$ Generation Partnership Project, Valbonne, France (Oct. 7-11, 2013).
"Method of resource allocation for D2D discovery," 3GPP TSG RAN WG1 Meeting #74bis, Guangzhou, China, R1-134638, 3$^{rd}$ Generation Partnership Project, Valbonne, France (Oct. 7-11, 2013).
"RAN2 Aspects of D2D Push or Pull Discovery models," 3GPP TSG-RAN WG2 #83bis, Ljubljana, Slovenia, R2-133400, 3$^{rd}$ Generation Partnership Project, Valbonne, France (Oct. 7-11, 2013).
"Two approaches for D2D discovery procedure," 3GPP TSG-RAN WG2 #83bis, Ljubljana, Slovenia, R2-133585, 3$^{rd}$ Generation Partnership Project, Valbonne, France (Oct. 7-11, 2013).
"Techniques for D2D Discovery," 3GPP TSG-RAN WG1 #73, Fukuoka, Japan, R1-132503, 3rd Generation Partnership Project, Valbonne, France (May 20-24, 2013).
"Techniques for D2D Discovery," 3GPP TSG-RAN WG1 #74, Barcelona, Spain, R1- 133600, 3$^{rd}$ Generation Partnership Project, Valbonne, France (Aug. 19-23, 2013).
"Comparison of Type 1, Type 2a, and Type 2b Discovery Resource Allocation," 3GPP TSG RAN WG2 Meeting #83bis, Ljubljana, Slovenia, R2-133278, 3$^{rd}$ Generation Partnership Project, Valbonne, France (Oct. 7-11, 2013).

* cited by examiner

COMMUNICATION METHOD, BASE STATION, AND TERMINAL

CROSS-REFERENCE

This application is a continuation of International Patent Application No. PCT/CN2013/085444, filed on Oct. 18, 2013, which is hereby incorporated by reference in its entirety.

TECHNICAL FIELD

The present invention relates to the communications field, and in particular, to a communication method, a base station, and a terminal.

BACKGROUND

Device to device communication (D2D) refers to a communication mode in which user equipment (UE) directly communicate without using a base station. A D2D technology can play a function of reducing burden of a macro network and increasing a rate of communication between UEs.

To implement direct communication between the UEs, the UEs need to discover each other first. To introduce the D2D communication mode into a Long Term Evolution (Long Term Evolution, LTE for short) system, a discovery (Discovery) time period needs to be inserted into the LTE system according to a specific rule, and each UE transmits a discovery signal in the discovery time period, so as to be discovered by another UE. In order not to affect cellular communication of a current LTE system, a time interval between every two discovery time periods may be long, for example, from several hundred milliseconds to several seconds. In terms of time, each discovery time period is divided into several time units, each of which is represented by $j \in J$, and each time unit may be divided according to a same rule in a frequency division manner into several frequency-domain units, each of which is represented by $i \in I$. The $i^{th}$ frequency-domain unit in the $j^{th}$ time unit is referred to as the $(i, j)^{th}$ frequency-time unit. In each discovery time period, each UE involved in D2D communication may send a discovery signal in a frequency-time unit, to facilitate detection of another UE. Generally, in consideration of that a scenario in which UEs that transmit discovery signals at the same time cannot discover each other, frequency-time hopping needs to be performed on a pattern of each discovery time period, that is, a frequency-time location at which each UE transmits a discovery signal in each discovery time period is made different, so that each UE has a chance to be discovered by all other UEs, and the pattern of the discovery time period is a frequency-time pattern of the discovery time period.

However, in the LTE system, when an interval between two consecutive discovery time periods is long, UE cannot obtain a frequency-time pattern of a discovery time period.

SUMMARY

Embodiments of the present invention provide a communication method, a base station, and a terminal, to resolve a problem in the prior art that the terminal cannot obtain a frequency-time pattern of a discovery time period when an interval between two consecutive discovery time periods is long.

According to a first aspect of the present invention, a communication method is provided, including:

generating, by a base station, an identifier of a current discovery frame of a current discovery time period; and broadcasting, by the base station, the identifier of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

With reference to the first aspect, in a first possible implementation manner, the obtaining, by a base station, an identifier of a current discovery frame of a current discovery time period includes:

calculating, by the base station, the identifier of the current discovery frame of the current discovery time period according to a sequence number of the current discovery time period and a cycle period of a discovery frame.

With reference to the first possible implementation manner of the first aspect, in a second possible implementation manner, the calculating, by the base station, the identifier of the current discovery frame of the current discovery time period according to a sequence number of the current discovery time period and a cycle period of a discovery frame includes:

calculating, by the base station, the identifier of the current discovery frame of the current discovery time period according to a formula index=t mod N; where index is the identifier of the current discovery frame of the current discovery time period, t is the sequence number of the current discovery time period, N is the cycle period of a discovery frame, and mod is a modulo operation.

With reference to the first aspect, in a third possible implementation manner, the broadcasting, by the base station, the identifier of the current discovery frame of the current discovery time period includes:

sending, by the base station, the broadcast before the current discovery time period arrives, where the broadcast includes the identifier of the current discovery frame of the current discovery time period; or sending, by the base station, the broadcast within the current discovery time period, where the broadcast includes the identifier of the current discovery frame of the current discovery time period.

With reference to the first aspect, in a fourth possible implementation manner, the broadcasting, by the base station, the identifier of the current discovery frame of the current discovery time period includes:

sending, by the base station, the broadcast before the preset discovery time period arrives, where the broadcast includes the identifier of the current discovery frame of the current discovery time period; or sending, by the base station, the broadcast within the preset discovery time period, where the broadcast includes the identifier of the current discovery frame of the current discovery time period.

According to a second aspect of the present invention, a communication method is provided, including:

receiving, by a terminal, a broadcast sent by a base station, and acquiring an identifier of a current discovery frame of a current discovery time period from the broadcast; and acquiring, according to the identifier of the current discovery frame of the current discovery time period, a frequency-time pattern of the current discovery time period or a frequency-time pattern of a discovery time period that is after the current discovery time period.

With reference to the second aspect, in a first possible implementation manner, the identifier of the current discovery frame of the current discovery time period is obtained according to a sequence number of the current discovery time period and a cycle period of a discovery frame.

With reference to the second aspect, in a second possible implementation manner, the receiving, by a terminal, a broadcast sent by a base station, and acquiring an identifier of a current discovery frame of a current discovery time period from the broadcast includes:

receiving, by the terminal by using the broadcast, the identifier of the current discovery frame of the current discovery time period before the current discovery time period arrives; or receiving, by the terminal by using the broadcast, the identifier of the current discovery frame of the current discovery time period within the current discovery time period.

With reference to the second aspect, in a third possible implementation manner, if the current discovery time period is a preset discovery time period, the receiving, by a terminal, a broadcast sent by a base station, and acquiring an identifier of a current discovery frame of a current discovery time period from the broadcast includes:

receiving, by the terminal by using the broadcast, the identifier of the current discovery frame of the current discovery time period before the preset discovery time period arrives; or receiving, by the terminal by using the broadcast, the identifier of the current discovery frame of the current discovery time period within the preset discovery time period; or if the current discovery time period is a discovery time period that is after a preset discovery time period, the receiving, by a terminal, a broadcast sent by a base station, and acquiring an identifier of a current discovery frame of a current discovery time period from the broadcast includes:

calculating, by the terminal, the identifier of the current discovery frame of the current discovery time period according to an identifier of a current discovery frame of the preset discovery time period and a system clock.

According to a third aspect of the present invention, a base station is provided, including:

an identifier generation unit, configured to generate an identifier of a current discovery frame of a current discovery time period; and a broadcasting unit, configured to broadcast the identifier, generated by the identifier generation unit, of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

With reference to the third aspect, in a first possible implementation manner, the identifier generation unit is specifically configured to:

calculate the identifier of the current discovery frame of the current discovery time period according to a sequence number of the current discovery time period and a cycle period of a discovery frame.

With reference to the first possible implementation manner of the third aspect, in a second possible implementation manner, the identifier generation unit is specifically configured to:

calculate the identifier of the current discovery frame of the current discovery time period according to a formula index=t mod N; where index is the identifier of the current discovery frame of the current discovery time period, t is the sequence number of the current discovery time period, N is the cycle period of a discovery frame, and mod is a modulo operation.

With reference to the third aspect, in a third possible implementation manner, the broadcasting unit is specifically configured to:

send the broadcast before the current discovery time period arrives, where the broadcast includes the identifier, generated by the identifier generation unit, of the current discovery frame of the current discovery time period; or send the broadcast within the current discovery time period, where the broadcast includes the identifier, generated by the identifier generation unit, of the current discovery frame of the current discovery time period.

With reference to the third aspect, in a fourth possible implementation manner, the broadcasting unit is specifically configured to:

send the broadcast before the preset discovery time period arrives, where the broadcast includes the identifier, generated by the identifier generation unit, of the current discovery frame of the current discovery time period; or send the broadcast within the preset discovery time period, where the broadcast includes the identifier, generated by the identifier generation unit, of the current discovery frame of the current discovery time period.

According to a fourth aspect of the present invention, a terminal is provided, including:

a receiving unit, configured to: receive a broadcast sent by a base station, and acquire an identifier of a current discovery frame of a current discovery time period from the broadcast; and an acquiring unit, configured to acquire, according to the identifier, acquired by the receiving unit, of the current discovery frame of the current discovery time period, a frequency-time pattern of the current discovery time period or a frequency-time pattern of a discovery time period that is after the current discovery time period.

With reference to the fourth aspect, in a first possible implementation manner, the identifier, acquired by the receiving unit, of the current discovery frame of the current discovery time period is obtained according to a sequence number of the current discovery time period and a cycle period of a discovery frame.

With reference to the fourth aspect, in a second possible implementation manner, the receiving unit is specifically configured to:

receive, by using the broadcast, the identifier of the current discovery frame of the current discovery time period before the current discovery time period arrives; or receive, by using the broadcast, the identifier of the current discovery frame of the current discovery time period within the current discovery time period.

With reference to the fourth aspect, in a third possible implementation manner, if the current discovery time period is a preset discovery time period, the receiving unit is specifically configured to:

receive, by using the broadcast, the identifier of the current discovery frame of the current discovery time period before the preset discovery time period arrives; or receive, by using the broadcast, the identifier of the current discovery frame of the current discovery time period within the preset discovery time period; or if the current discovery time period is a discovery time period that is after a preset discovery time period, the receiving unit is specifically configured to:

calculate the identifier of the current discovery frame of the current discovery time period according to an identifier of a current discovery frame of the preset discovery time period and a system clock.

According to a fifth aspect of the present invention, a base station is provided, including at least one processor, a memory, a bus, and a transmitter, where the bus is configured to implement connection and communication between the processor and the memory, and the memory is configured to store program code that is executed by the processor and data; where the processor is configured to generate an identifier of a current discovery frame of a current discovery time period; and the transmitter is configured to broadcast the identifier, generated by the processor, of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

With reference to the fifth aspect, in a first possible implementation manner, the processor is specifically configured to:

calculate the identifier of the current discovery frame of the current discovery time period according to a sequence number of the current discovery time period and a cycle period of a discovery frame.

With reference to the first possible implementation manner of the fifth aspect, in a second possible implementation manner, the processor is specifically configured to:

calculate the identifier of the current discovery frame of the current discovery time period according to a formula index=t mod N; where index is the identifier of the current discovery frame of the current discovery time period, t is the sequence number of the current discovery time period, N is the cycle period of a discovery frame, and mod is a modulo operation.

With reference to the fifth aspect, in a third possible implementation manner, the transmitter is specifically configured to:

send the broadcast before the current discovery time period arrives, where the broadcast includes the identifier, generated by the processor, of the current discovery frame of the current discovery time period; or send the broadcast within the current discovery time period, where the broadcast includes the identifier, generated by the processor, of the current discovery frame of the current discovery time period.

With reference to the fifth aspect, in a fourth possible implementation manner, the transmitter is specifically configured to:

send the broadcast before the preset discovery time period arrives, where the broadcast includes the identifier, generated by the processor, of the current discovery frame of the current discovery time period; or send the broadcast within the preset discovery time period, where the broadcast includes the identifier, generated by the processor, of the current discovery frame of the current discovery time period.

According to a sixth aspect of the present invention, a terminal is provided, including at least one processor, a memory, a bus, and a receiver, where the bus is configured to implement connection and communication between the processor and the memory, and the memory is configured to store program code that is executed by the processor and data; where the receiver receives a broadcast sent by a base station, and the processor is configured to acquire an identifier of a current discovery frame of a current discovery time period from the broadcast; and the processor is configured to acquire, according to the identifier of the current discovery frame of the current discovery time period, a frequency-time pattern of the current discovery time period or a frequency-time pattern of a discovery time period that is after the current discovery time period.

With reference to the sixth aspect, in a first possible implementation manner, the identifier of the current discovery frame of the current discovery time period is obtained according to a sequence number of the current discovery time period and a cycle period of a discovery frame.

With reference to the sixth aspect, in a second possible implementation manner, the receiver is specifically configured to:

receive, by using the broadcast, the identifier of the current discovery frame of the current discovery time period before the current discovery time period arrives; or receive, by using the broadcast, the identifier of the current discovery frame of the current discovery time period within the current discovery time period.

With reference to the sixth aspect, in a third possible implementation manner, if the current discovery time period is a preset discovery time period, the receiver is specifically configured to:

receive, by using the broadcast, the identifier of the current discovery frame of the current discovery time period before the preset discovery time period arrives; or receive, by using the broadcast, the identifier of the current discovery frame of the current discovery time period within the preset discovery time period; or if the current discovery time period is a discovery time period that is after a preset discovery time period, the receiver is specifically configured to:

calculate, the identifier of the current discovery frame of the current discovery time period according to an identifier of a current discovery frame of the preset discovery time period and a system clock.

According to the communication method, the base station, and the terminal that are provided in the embodiments of the present invention, the base station broadcasts an identifier of a current discovery frame of a current discovery time period, so that the terminal acquires a frequency-time pattern of the current discovery time period according to the identifier of the current discovery frame of the current discovery time period, which resolves a problem in the prior art that the terminal cannot obtain a frequency-time pattern of a discovery time period when an interval between two consecutive discovery time periods is long.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

Embodiments of the present invention are applicable to D2D communication, and in particular, to a scenario in which D2D communication is introduced into an LTE system. LTE is used as an example in the embodiments of the present invention for description. When the D2D communication is introduced into the LTE system, generally some fixed frames may be used as discovery time periods and allocated for the D2D communication.

Figure 1:
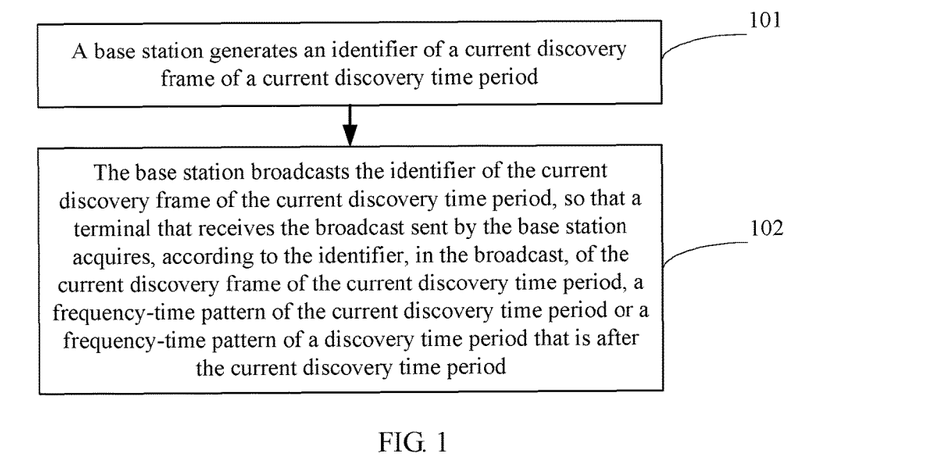
FIG. 1 is a schematic flowchart of a communication method according to an embodiment of the present invention.

FIG. 1 is a schematic flowchart of a communication method according to an embodiment of the present invention. The method is executed by a base station. Referring to FIG. 1, the method may include the following steps:

101. The base station generates an identifier of a current discovery frame of a current discovery time period.

In D2D communication, in each discovery time period, each terminal involved in the D2D communication may send a discovery signal in a frequency-time unit, so as to be detected by another terminal. To give each terminal a chance to be discovered by another terminal, frequency-time hopping needs to be performed on a pattern of each discovery time period, that is, each terminal has a different frequency-time location in each discovery time period.

The identifier of the current discovery frame is used to identify a frequency-time pattern of a discovery time period, and the terminal sends or receives a discovery signal according to the frequency-time pattern of the discovery time period.

102. The base station broadcasts the identifier of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

The base station sends the identifier of the current discovery frame of the current discovery time period in a broadcast manner, and the terminal that receives the broadcast obtains the frequency-time pattern of the current discovery time period according to the identifier, in the broadcast, of the current discovery frame of the current discovery time period. According to a specific situation, the terminal may further acquire, according to the frequency-time pattern of the current discovery time period, the frequency-time pattern of the discovery time period that is after the current discovery time period, for example, a frequency-time pattern of a next discovery time period of the current discovery time period.

In this embodiment, a base station broadcasts an identifier of a current discovery frame of a current discovery time period, so that a terminal acquires a frequency-time pattern of the current discovery time period according to the identifier of the current discovery frame of the current discovery time period, which resolves a problem in the prior art that the terminal cannot obtain a frequency-time pattern of a discovery time period when an interval between two consecutive discovery time periods is long.

On the basis of the foregoing solution, in step 101, the obtaining, by a base station, an identifier of a current discovery frame of a current discovery time period may preferably include:

calculating, by the base station, the identifier of the current discovery frame of the current discovery time period according to a sequence number of the current discovery time period and a cycle period of a discovery frame.

Specifically, the calculating, by the base station, the identifier of the current discovery frame of the current discovery time period according to a sequence number of the current discovery time period and a cycle period of a discovery frame may include the following:

according to a formula index=t mod N (1), calculating, by the base station, the identifier of the current discovery frame of the current discovery time period, where index is the identifier of the current discovery frame of the current discovery time period, t is the sequence number of the current discovery time period, N is the cycle period of a discovery frame, and mod is a modulo operation; the formula (1) indicates that a remainder obtained after the sequence number of the current discovery time period is divided by the cycle period of a discovery frame is the identifier of the current discovery frame of the current discovery time period.

A frequency-time hopping solution is generally reckoning values of i(t) and j(t) of the current discovery time period t according to initial values of a frequency-time location, that is, values of i(0) and j(0), and a value of the sequence number t of the current discovery time period, so as to obtain a frequency-time location of the current discovery time period.

Figure 2:
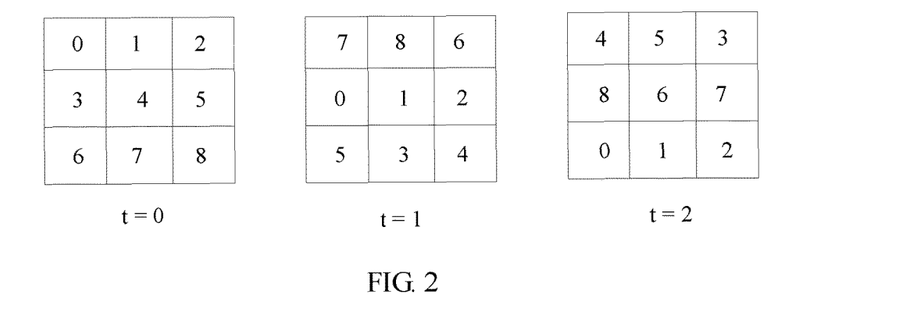
FIG. 2 is a schematic diagram of a frequency-time pattern of a discovery time period according to an embodiment of the present invention.

For example, refer to frequency-time patterns of discovery time periods corresponding to scenarios in which a discovery time period sequence number t is 0, 1, and 2, as shown in FIG. 2, where, the frequency-time patterns are frequency-time locations of nine terminals with sequence numbers from 0 to 8 when the discovery time period sequence number is t. In FIG. 2, a horizontal coordinate corresponds to a time unit j, and a vertical coordinate corresponds to a frequency-domain unit i.

A frequency-time hopping solution shown in FIG. 2 may be obtained by means of the following:

$I=\{0,1,\ldots,m-1\}, J=\{0,1,\ldots,n-1\}, m<=n,$ $i(t)=i(0)+c*t \bmod m (2)$ $j(t)=j(0)+i(0)*t \bmod n(3)$, where c is a constant.

For example, when m=n=3, c=1, and initial values of a frequency-time location at which a terminal with a sequence number 0 sends a discovery signal are i(0)=0 and j(0)=0. In FIG. 2, in an identifier of a current discovery frame of a discovery time period corresponding to a discovery time period sequence number t=0, a frequency-time location is (0, 0). That i(1)=1 and j(1)=0 may be obtained according to the formula (2) and the formula (3), and in FIG. 2, in a frequency-time pattern of a discovery time period corresponding to a discovery time period sequence number t=1, a frequency-time location is (1, 0). Initial values of a frequency-time location at which a terminal with a sequence number 1 sends a discovery signal are i(0)=0 and j(0)=1. In FIG. 2, in a frequency-time pattern of a discovery time period corresponding to a discovery time period sequence number t=0, a frequency-time location is (0, 1). That i(1)=1 and j(1)=1 may be obtained according to the formula (2) and the formula (3), and in FIG. 2, in a frequency-time pattern of a discovery time period corresponding to a discovery time period sequence number t=1, a frequency-time location is (1, 1).

It may be learnt from the formula (2) and the formula (3) that, a hopping pattern of a discovery time period whose t is greater than 2 appears in a cyclic manner according to a hopping pattern shown in FIG. 1. A cycle period N of a hopping pattern of a discovery time period in FIG. 2 is 3.

Therefore, the identifier of the current discovery frame of the current discovery time period may be calculated according to the formula (1).

The identifier of the current discovery frame of the current discovery time period may be a relative sequence number of the discovery time period sequence number t in the cycle period of the discovery time period, that is, (t mod N). For example, N=3; when t=0, an identifier of a current discovery frame of a corresponding discovery time period is 0; when t=1, an identifier of a current discovery frame of a corresponding discovery time period is 1; for a value of t greater than 2, when t=3, an identifier of a current discovery frame of a corresponding discovery time period is 0, and when t=4, an identifier of a current discovery frame of a corresponding discovery time period is 1.

In an LTE system, the base station may broadcast the identifier of the current discovery frame of the current discovery time period, and the terminal that receives the broadcast obtains the identifier of the current discovery frame of the current discovery time period from the broadcast. The identifier of the current discovery frame is obtained according to the sequence number of the current discovery time period and a cycle period of the identifier of the current discovery frame, and the terminal obtains the frequency-time pattern of the current discovery time period according to the identifier of the current discovery frame.

Further, on the basis of the foregoing solution, the broadcasting, by the base station, the identifier of the current discovery frame of the current discovery time period may include:

sending, by the base station, the broadcast before the current discovery time period arrives, where the broadcast includes the identifier of the current discovery frame of the current discovery time period.

Before each discovery time period allocated for D2D communication in the LTE system arrives, the broadcast sent by the base station includes the identifier of the current discovery frame of the current discovery time period, and the terminal that receives the broadcast obtains the identifier of the current discovery frame of the current discovery time period from the broadcast, and obtains the frequency-time pattern of the current discovery time period according to the identifier of the current discovery frame of the current discovery time period.

Alternatively, the base station sends the broadcast within the current discovery time period, where the broadcast includes the identifier of the current discovery frame of the current discovery time period.

The base station may also send, within each discovery time period allocated for D2D communication in the LTE system, the broadcast that includes the identifier of the current discovery frame of the current discovery time period, and the terminal that receives the broadcast obtains the identifier of the current discovery frame of the current discovery time period from the broadcast, and obtains the frequency-time pattern of the current discovery time period according to the identifier of the current discovery frame of the current discovery time period.

In this solution, a base station sends, by using a broadcast, an identifier of a current discovery frame of a current discovery time period before the current discovery time period arrives or within the current discovery time period, so that a terminal that receives the broadcast may obtain, according to the identifier of the current discovery frame of the current discovery time period, a frequency-time pattern of the current discovery time period or a frequency-time pattern of a discovery time period that is after the current discovery time period.

Optionally, the base station may also send, within some discovery time periods allocated for D2D communication in the LTE system, the broadcast that includes the identifier of the current discovery frame of the current discovery time period. If the current discovery time period is a preset discovery time period, the broadcasting, by the base station, the identifier of the current discovery frame of the current discovery time period may include:

sending, by the base station, the broadcast before the preset discovery time period arrives, where the broadcast includes the identifier of the current discovery frame of the current discovery time period; or sending, by the base station, the broadcast within the preset discovery time period, where the broadcast includes the identifier of the current discovery frame of the current discovery time period.

The preset discovery time period may include some discovery time periods in discovery time periods allocated for the D2D communication in the LTE system. Specifically, the following solutions may be included:

Solution 1: A Cycle Period of a Discovery Frame is N, where N Includes an Integer Divisible by 2.

The system may broadcast a value of (2k mod N) within the $2k^{th}$ discovery time period or before the $2k^{th}$ discovery time period arrives, and use the value as the identifier of the current discovery frame of the current discovery time period, where k=0, 1, 2 . . . .

The terminal obtains the frequency-time pattern of the current discovery time period according to the identifier of the current discovery frame of the current discovery time period.

Solution 2: A Cycle Period of a Discovery Frame is N, where N Includes an Integer Divisible by 2.

The system may broadcast a value of (k mod N/2) within the $2k^{th}$ discovery time period or before the $2k^{th}$ discovery time period arrives, and use the value as the identifier of the current discovery frame of the current discovery time period, where k=0, 1, 2 . . . .

The terminal obtains (2k mod N) according to the identifier of the current discovery frame of the current discovery time period, which equals to obtaining the sequence number of the current discovery time period, so that the frequency-time pattern of the current discovery time period is obtained.

Solution 3: A Cycle Period of a Discovery Frame is N, where N Includes an Integer Divisible by 2.

The system may broadcast a value of (2k+1 mod N) within the $(2k+1)^{th}$ discovery time period or before the $(2k+1)^{th}$ discovery time period arrives, and use the value as the identifier of the current discovery frame of the current discovery time period, where k=0, 1, 2 . . . .

The terminal obtains the frequency-time pattern of the current discovery time period according to the identifier of the current discovery frame of the current discovery time period.

Solution 4: A Cycle Period of a Discovery Frame is N, where N Includes an Integer Divisible by 2.

The system may broadcast a value of (k mod N/2) within the $(2k+1)^{th}$ discovery time period or before the $(2k+1)^{th}$ discovery time period arrives, and use the value as the identifier of the current discovery frame of the current discovery time period, where k=0, 1, 2 . . . .

The terminal obtains (2k+1 mod N) according to the identifier of the current discovery frame of the current discovery time period, which equals to obtaining the sequence number of the current discovery time period, so that the frequency-time pattern of the current discovery time period is obtained.

Solution 5: A Cycle Period of a Discovery Frame is N, where N Includes an Integer Divisible by 3.

The system may broadcast a value of (3k mod N) within the $3k^{th}$ discovery time period or before the $3k^{th}$ discovery time period arrives, and use the value as the identifier of the current discovery frame of the current discovery time period, where k=0, 1, 2 . . . .

The terminal obtains the frequency-time pattern of the current discovery time period according to the identifier of the current discovery frame of the current discovery time period.

Solution 6: A Cycle Period of a Discovery Frame is N, where N Includes an Integer Divisible by 3.

The system may broadcast a value of (k mod N/3) within the $3k^{th}$ discovery time period or before the $3k^{th}$ discovery time period arrives, and use the value as the identifier of the current discovery frame of the current discovery time period, where k=0, 1, 2 . . . .

The terminal obtains (3k mod N) according to the identifier of the current discovery frame of the current discovery time period, which equals to obtaining the sequence number of the current discovery time period, so that the frequency-time pattern of the current discovery time period is obtained.

Solution 7: A Cycle Period of a Discovery Frame is N, where N Includes an Integer Divisible by 3.

The system may broadcast a value of (3k+1 mod N) within the $(3k+1)^{th}$ discovery time period or before the $(3k+1)^{th}$ discovery time period arrives, and use the value as the identifier of the current discovery frame of the current discovery time period, where k=0, 1, 2 . . . .

The terminal obtains the frequency-time pattern of the current discovery time period according to the identifier of the current discovery frame of the current discovery time period.

Solution 8: A Cycle Period of a Discovery Frame is N, where N Includes an Integer Divisible by 3.

The system may broadcast a value of (k mod N/3) within the $(3k+1)^{th}$ discovery time period or before the $(3k+1)^{th}$ discovery time period arrives, and use the value as the identifier of the current discovery frame of the current discovery time period, where k=0, 1, 2 . . . .

The terminal obtains (3k+1 mod N) according to the identifier of the current discovery frame of the current discovery time period, which equals to obtaining the sequence number of the current discovery time period, so that the frequency-time pattern of the current discovery time period is obtained.

Solution 9: A Cycle Period of a Discovery Frame is N, where N Includes an Integer Divisible by 3.

The system may broadcast a value of (3k+2 mod N) within the $(3k+2)^{th}$ discovery time period or before the $(3k+2)^{th}$ discovery time period arrives, and use the value as the identifier of the current discovery frame of the current discovery time period, where k=0, 1, 2 . . . .

The terminal obtains the frequency-time pattern of the current discovery time period according to the identifier of the current discovery frame of the current discovery time period.

Solution 10: A cycle period of a discovery frame is N, where N includes an integer divisible by 3.

The system may broadcast a value of (k mod N/3) within the $(3k+2)^{th}$ discovery time period or before the $(3k+2)^{th}$ discovery time period arrives, and use the value as the identifier of the current discovery frame of the current discovery time period, where k=0, 1, 2 . . . .

The terminal obtains (3k+2 mod N) according to the identifier of the current discovery frame of the current discovery time period, which equals to obtaining the sequence number of the current discovery time period, so that the frequency-time pattern of the current discovery time period is obtained.

In this solution, a base station sends, by using a broadcast, an identifier of a current discovery frame of a current discovery time period before a preset discovery time period arrives or within a preset discovery time period, so that a terminal that receives the broadcast obtains a frequency-time pattern of the current discovery time period according to the identifier, in the broadcast, of the current discovery frame of the current discovery time period. Obviously, the preset discovery time period includes more than the foregoing ten solutions, which are not enumerated one by one in this embodiment of the present invention.

Figure 3:
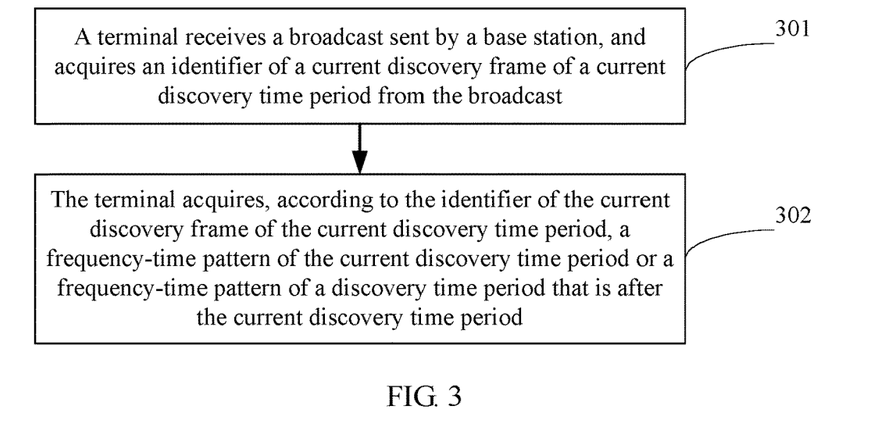
FIG. 3 is a schematic flowchart of a communication method according to another embodiment of the present invention.

FIG. 3 is a schematic flowchart of a communication method according to another embodiment of the present invention. This embodiment is executed by a terminal. Referring to FIG. 3, the method may include the following steps:

301. The terminal receives a broadcast sent by a base station, and acquires an identifier of a current discovery frame of a current discovery time period from the broadcast.

The identifier of the current discovery frame is used to identify a frequency-time pattern of a discovery time period, and the terminal sends or receives a discovery signal according to the frequency-time pattern of the discovery time period. The identifier of the discovery frame of the discovery time period is obtained according to a sequence number of the current discovery time period and a cycle period of a discovery frame. Specifically, refer to the formula (1).

Optionally, in step 301, the receiving, by a terminal, a broadcast sent by a base station, and acquiring an identifier of a current discovery frame of a current discovery time period from the broadcast may include:

receiving, by the terminal by using the broadcast, the identifier of the current discovery frame of the current discovery time period before the current discovery time period arrives.

Before each discovery time period allocated for D2D communication in an LTE system arrives, the broadcast sent by the base station includes the identifier of the current discovery frame of the current discovery time period, and the terminal that receives the broadcast obtains the identifier of the current discovery frame of the current discovery time period from the broadcast.

Alternatively, the terminal receives, by using the broadcast, the identifier of the current discovery frame of the current discovery time period within the current discovery time period.

The base station may also send, within each discovery time period allocated for D2D communication in an LTE system, the broadcast that includes the identifier of the current discovery frame of the current discovery time period, and the terminal that receives the broadcast obtains the identifier of the current discovery frame of the current discovery time period from the broadcast.

In this solution, a terminal receives an identifier of a current discovery frame of a current discovery time period before the current discovery time period arrives or within the current discovery time period, and may obtain a frequency-time pattern of the current discovery time period according to the identifier of the current discovery frame.

Further, optionally, in step 301, the base station may also send, within some discovery time periods allocated for D2D communication in an LTE system, the broadcast that includes the identifier of the current discovery frame of the current discovery time period.

Specifically, if the current discovery time period is a preset discovery time period, in step 301, the receiving, by a terminal, a broadcast sent by a base station, and acquiring an identifier of a current discovery frame of a current discovery time period from the broadcast may include:

receiving, by the terminal by using the broadcast, the identifier of the current discovery frame of the current discovery time period before the preset discovery time period arrives; or receiving, by the terminal by using the broadcast, the identifier of the current discovery frame of the current discovery time period within the preset discovery time period.

The preset discovery time period may include some discovery time periods in discovery time periods allocated for the D2D communication in the LTE system. Specifically, refer to the foregoing solutions 1 to 10.

Optionally, if the current discovery time period is a discovery time period that is after a preset discovery time period, in step 301, the receiving, by a terminal, a broadcast sent by a base station, and acquiring an identifier of a current discovery frame of a current discovery time period from the broadcast may include:

calculating, by the terminal, the identifier of the current discovery frame of the current discovery time period according to an identifier of a current discovery frame of the preset discovery time period and a system clock.

The terminal receives the identifier of the current discovery frame of the preset discovery time period, and may calculate, according to the identifier of the current discovery frame of the preset discovery time period and the system clock, an identifier (that is, the identifier of the current discovery frame of the current discovery time period) of a current discovery frame of the discovery time period that is after the preset discovery time period.

In this solution, a terminal receives, by using a broadcast, an identifier of a current discovery frame of a current discovery time period before a preset discovery time period arrives or within a preset discovery time period, and may obtain a frequency-time pattern of the current discovery time period according to the identifier, in the broadcast, of the current discovery frame of the current discovery time period.

302. The terminal acquires, according to the identifier of the current discovery frame of the current discovery time period, a frequency-time pattern of the current discovery time period or a frequency-time pattern of a discovery time period that is after the current discovery time period.

The terminal acquires, according to initial values of a frequency-time location, the identifier of the current discovery frame of the current discovery time period, and a hopping function, the frequency-time pattern of the current discovery time period or the frequency-time pattern of the discovery time period that is after the current discovery time period.

The hopping function is a function of recursion from a frequency-time location of the current discovery time period to a frequency-time location of a next discovery time period, that is, is a frequency-time location relationship of a discovery signal in consecutive discovery time periods. For example, the formulas (2) and (3) show the hopping function.

Specifically, the terminal obtains initial values of a frequency-time location of the terminal in advance, that is, initial values of a frequency-time location used when a discovery time period sequence number t=0, may obtain a frequency-time pattern of the terminal in the current discovery time period according to the identifier of the current discovery frame of the current discovery time period and with reference to the formulas (2) and (3), and sends a discovery signal at a frequency-time location in the frequency-time pattern, so as to be discovered by another terminal.

The terminal may further obtain a frequency-time location of another terminal in the current discovery time period according to the identifier of the current discovery frame of the current discovery time period and with reference to the formulas (2) and (3). Specifically, the terminal may obtain, according to the identifier of the current discovery frame of the current discovery time period, an identifier of a discovery frame of a discovery time period that is before the current discovery time period, may calculate initial values of a frequency-time location of the another terminal according to the identifier of the discovery frame and the frequency-time location, detected in the discovery time period that is before the current discovery time period, of the another terminal and with reference to the formulas (2) and (3), may obtain a frequency-time pattern of the another terminal in the current discovery time period according to the initial values and the identifier of the current discovery frame of the current discovery time period, and receives a discovery signal of the another terminal at the frequency-time location, in the frequency-time pattern, of the another terminal. The terminal may also detect the discovery signal of the another terminal jointly in the current discovery time period and the discovery time period that is before the current discovery time period, and if the detection succeeds, the terminal may perform end-to-end communication with the another terminal.

By analogy, the terminal may further obtain, according to the frequency-time pattern of the current discovery time period, the frequency-time pattern of the discovery time period that is after the current discovery time period, and may further obtain frequency-time patterns of discovery time periods in an entire cycle period.

If the terminal finds by means of detection the discovery signal of the another terminal in the current discovery time period but a receiving effect of the discovery signal is extremely poor due to a reason of interference, poor channel quality, or the like, the terminal may detect, in the discovery time period that is after the current discovery time period, for example, a next discovery time period, the discovery signal of the another terminal again at the obtained frequency-time location of the another terminal, or may perform joint detection, and if the detection succeeds, the terminal may perform end-to-end communication with the another terminal.

If the terminal does not find by means of detection the discovery signal of the another terminal in the current discovery time period, the terminal may obtain the frequency-time pattern of the terminal in the current discovery time period according to the identifier of the current discovery frame of the current discovery time period and with reference to the formulas (2) and (3), and sends a discovery signal at a frequency-time location corresponding to the frequency-time pattern, so as to be discovered by the another terminal. The terminal may further obtain, according to the frequency-time pattern of the current discovery time period and with reference to the formulas (2) and (3), the frequency-time pattern of the terminal in the discovery time period that is after the current discovery time period, and sends a discovery signal at a frequency-time location corresponding to the frequency-time pattern, so as to be discovered by the another terminal.

Optionally, if the current discovery time period is a discovery time period that is after a preset discovery time period, the terminal calculates the identifier of the current discovery frame of the current discovery time period according to an identifier, received from the broadcast, of a current discovery frame of the preset discovery time period and a system clock, and obtains the frequency-time pattern of the current discovery time period according to the obtained identifier of the current discovery frame of the current discovery time period.

In this embodiment, a terminal acquires an identifier of a current discovery frame of a current discovery time period from a broadcast sent by a base station, and obtains, according to the identifier of the current discovery frame, a frequency-time pattern of the current discovery time period or that of a discovery time period that is after the current discovery time period, which resolves a problem in the prior art that the terminal cannot obtain a frequency-time pattern of a discovery time period when an interval between two consecutive discovery time periods is long.

Figure 4:
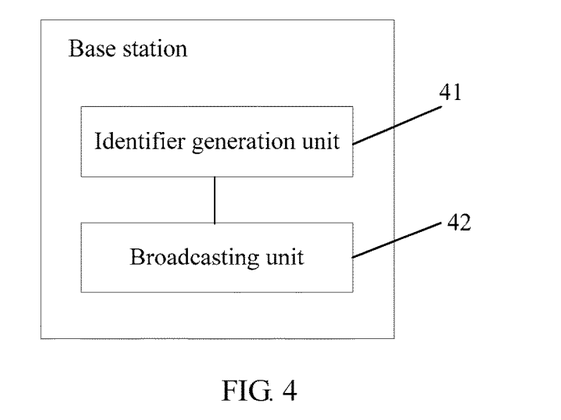
FIG. 4 is a schematic structural diagram of a base station according to an embodiment of the present invention.

FIG. 4 is a schematic structural diagram of a base station according to an embodiment of the present invention. The base station is configured to execute the communication method in the foregoing embodiment, and the base station includes an identifier generation unit 41 and a broadcasting unit 42.

The identifier generation unit 41 is configured to generate an identifier of a current discovery frame of a current discovery time period.

The identifier of the current discovery frame is used to identify a frequency-time pattern of a discovery time period, and a terminal sends or receives a discovery signal according to the frequency-time pattern of the discovery time period.

The broadcasting unit 42 is configured to broadcast the identifier, generated by the identifier generation unit, of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

The base station sends the identifier of the current discovery frame of the current discovery time period in a broadcast manner, and the terminal that receives the broadcast obtains the frequency-time pattern of the current discovery time period according to the identifier, in the broadcast, of the current discovery frame of the current discovery time period. According to a specific situation, the terminal may further acquire, according to the frequency-time pattern of the current discovery time period, the frequency-time pattern of the discovery time period that is after the current discovery time period, for example, a frequency-time pattern of a next discovery time period of the current discovery time period.

In this embodiment, a base station broadcasts an identifier of a current discovery frame of a current discovery time period, so that a terminal acquires a frequency-time pattern of the current discovery time period according to the identifier of the current discovery frame of the current discovery time period, which resolves a problem in the prior art that the terminal cannot obtain a frequency-time pattern of a discovery time period when an interval between two consecutive discovery time periods is long.

On the basis of the foregoing solution, the identifier generation unit 41 is specifically configured to:

calculate the identifier of the current discovery frame of the current discovery time period according to a sequence number of the current discovery time period and a cycle period of a discovery frame.

Specifically, the identifier generation unit 41 calculates the identifier of the current discovery frame of the current discovery time period according to a formula index=t mod N, where index is the identifier of the current discovery frame of the current discovery time period, t is the sequence number of the current discovery time period, N is the cycle period of a discovery frame, and mod is a modulo operation.

In an LTE system, the base station may broadcast the identifier of the current discovery frame of the current discovery time period, and the terminal that receives the broadcast obtains the identifier of the current discovery frame of the current discovery time period from the broadcast. The identifier of the current discovery frame is obtained according to the sequence number of the current discovery time period and a cycle period of the identifier of the current discovery frame, and the terminal obtains the frequency-time pattern of the current discovery time period according to the identifier of the current discovery frame.

Further, on the basis of the foregoing solution, the broadcasting unit 42 is specifically configured to:

send the broadcast before the current discovery time period arrives, where the broadcast includes the identifier, generated by the identifier generation unit, of the current discovery frame of the current discovery time period; or send the broadcast within the current discovery time period, where the broadcast includes the identifier, generated by the identifier generation unit, of the current discovery frame of the current discovery time period.

Before each discovery time period allocated for D2D communication in the LTE system arrives, the broadcast sent by the base station includes the identifier of the current discovery frame of the current discovery time period, and the terminal that receives the broadcast obtains the identifier of the current discovery frame of the current discovery time period from the broadcast, and obtains the frequency-time pattern of the current discovery time period according to the identifier of the current discovery frame of the current discovery time period.

Alternatively, the base station sends the broadcast within the current discovery time period, where the broadcast includes the identifier of the current discovery frame of the current discovery time period.

The base station may also send, within each discovery time period allocated for D2D communication in the LTE system, the broadcast that includes the identifier of the current discovery frame of the current discovery time period, and the terminal that receives the broadcast obtains the identifier of the current discovery frame of the current discovery time period from the broadcast, and obtains the frequency-time pattern of the current discovery time period according to the identifier of the current discovery frame of the current discovery time period.

In this solution, a base station sends, by using a broadcast, an identifier of a current discovery frame of a current discovery time period before the current discovery time period arrives or within the current discovery time period, so that a terminal that receives the broadcast may obtain, according to the identifier of the current discovery frame of the current discovery time period, a frequency-time pattern of the current discovery time period or a frequency-time pattern of a discovery time period that is after the current discovery time period.

Optionally, the base station may also send, within some discovery time periods allocated for D2D communication in the LTE system, the broadcast that includes the identifier of the current discovery frame of the current discovery time period. The broadcasting unit 42 is specifically configured to:

send the broadcast before a preset discovery time period arrives, where the broadcast includes the identifier, generated by the identifier generation unit, of the current discovery frame of the current discovery time period; or send the broadcast within a preset discovery time period, where the broadcast includes the identifier, generated by the identifier generation unit, of the current discovery frame of the current discovery time period.

The preset discovery time period may include some discovery time periods in discovery time periods allocated for the D2D communication in the LTE system. Specifically, refer to the solutions 1 to 10 in the foregoing embodiment.

In this solution, a base station sends, by using a broadcast, an identifier of a current discovery frame of a current discovery time period before a preset discovery time period arrives or within a preset discovery time period, so that a terminal that receives the broadcast obtains a frequency-time pattern of the current discovery time period according to the identifier, in the broadcast, of the current discovery frame of the current discovery time period.

Figure 5:
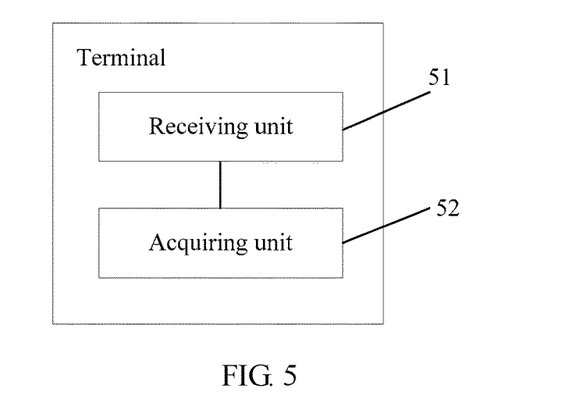
FIG. 5 is a schematic structural diagram of a terminal according to an embodiment of the present invention.

FIG. 5 is a schematic structural diagram of a terminal according to an embodiment of the present invention. The terminal is configured to execute the communication method in the foregoing embodiment, and the terminal includes a receiving unit 51 and an acquiring unit 52.

The receiving unit 51 is configured to: receive a broadcast sent by a base station, and acquire an identifier of a current discovery frame of a current discovery time period from the broadcast.

The identifier of the current discovery frame is used to identify a frequency-time pattern of a discovery time period, and the terminal sends or receives a discovery signal according to the frequency-time pattern of the discovery time period. The identifier, acquired by the receiving unit, of the discovery frame of the discovery time period is obtained according to a sequence number of the current discovery time period and a cycle period of a discovery frame. Specifically, refer to the formula (1).

The acquiring unit 52 is configured to acquire, according to the identifier, acquired by the receiving unit, of the current discovery frame of the current discovery time period, a frequency-time pattern of the current discovery time period or a frequency-time pattern of a discovery time period that is after the current discovery time period.

In this embodiment, a terminal acquires an identifier of a current discovery frame of a current discovery time period from a broadcast sent by a base station, and obtains, according to the identifier of the current discovery frame, a frequency-time pattern of the current discovery time period or that of a discovery time period that is after the current discovery time period, which resolves a problem in the prior art that the terminal cannot obtain a frequency-time pattern of a discovery time period when an interval between two consecutive discovery time periods is long.

On the basis of the foregoing solution, optionally, the receiving unit 51 is specifically configured to:

receive, by using the broadcast, the identifier of the current discovery frame of the current discovery time period before the current discovery time period arrives.

Before each discovery time period allocated for D2D communication in an LTE system arrives, the broadcast sent by the base station includes the identifier of the current discovery frame of the current discovery time period, and the terminal that receives the broadcast obtains the identifier of the current discovery frame of the current discovery time period from the broadcast.

Alternatively, the receiving unit 51 receives, by using the broadcast, the identifier of the current discovery frame of the current discovery time period within the current discovery time period. The base station may also send, within each discovery time period allocated for D2D communication in an LTE system, the broadcast that includes the identifier of the current discovery frame of the current discovery time period, and the terminal that receives the broadcast obtains the identifier of the current discovery frame of the current discovery time period from the broadcast.

In this solution, a terminal receives an identifier of a current discovery frame of a current discovery time period before the current discovery time period arrives or within the current discovery time period, and may obtain a frequency-time pattern of the current discovery time period according to the identifier of the current discovery frame.

Further, optionally, if the current discovery time period is a preset discovery time period, the receiving unit 51 is specifically configured to:

receive, by using the broadcast, the identifier of the current discovery frame of the current discovery time period before the preset discovery time period arrives; or receive, by using the broadcast, the identifier of the current discovery frame of the current discovery time period within the preset discovery time period.

The preset discovery time period may include some discovery time periods in discovery time periods allocated for the D2D communication in the LTE system. Specifically, refer to the foregoing solutions 1 to 10.

If the current discovery time period is a discovery time period that is after a preset discovery time period, the receiving unit 51 is specifically configured to:

calculate the identifier of the current discovery frame of the current discovery time period according to an identifier of a current discovery frame of the preset discovery time period and a system clock.

The terminal receives the identifier of the current discovery frame of the preset discovery time period, and may calculate, according to the identifier of the current discovery frame of the preset discovery time period and the system clock, an identifier (that is, the identifier of the current discovery frame of the current discovery time period) of a current discovery frame of the discovery time period that is after the preset discovery time period.

In this solution, a terminal receives, by using a broadcast, an identifier of a current discovery frame of a current discovery time period before a preset discovery time period arrives or within a preset discovery time period, and may obtain a frequency-time pattern of the current discovery time period according to the identifier, in the broadcast, of the current discovery frame of the current discovery time period.

Figure 6:
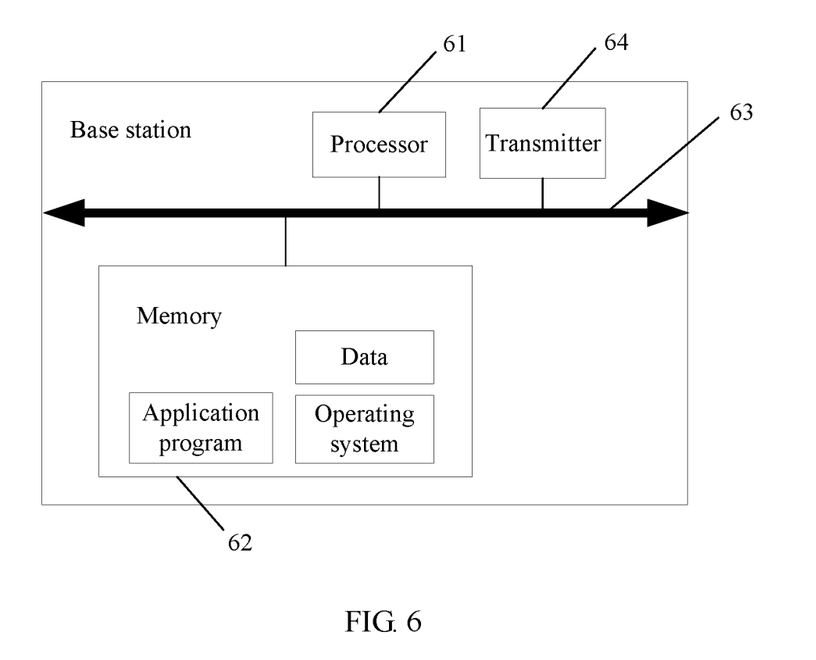
FIG. 6 is schematic structural diagram of a base station according to another embodiment of the present invention.

FIG. 6 is a schematic structural diagram of a base station according to another embodiment of the present invention, and the base station is configured to implement the communication method provided in the foregoing embodiment. Referring to FIG. 6, the base station includes at least one processor 61, a memory 62, a bus 63, and a transmitter 64, where the bus 63 is configured to implement connection and communication between the processor 61 and the memory 62, and the memory 62 is configured to store program code that is executed by the processor 61 and data.

The bus 63 may be an industry standard architecture (Industry Standard Architecture, ISA for short) bus, a peripheral component interconnect (PCI) bus, or an extended industry standard architecture (Extended Industry Standard Architecture, EISA for short) bus, or the like, which is not limited herein. The bus 63 may be categorized into an address bus, a data bus, a control bus, and the like. For ease of denotation, only one thick line is used in FIG. 6 to denote the bus, which, however, does not mean that there is only one bus or only one type of bus.

The memory 62 is configured to store the data or executable program code, where the program code includes a computer operation instruction that may be specifically an operating system, an application program, or the like. The memory 62 may include a high speed RAM memory, or may further include a non-volatile memory (non-volatile memory), for example, at least one magnetic disk storage.

The processor 61 may be a central processing unit (Central Processing Unit, CPU for short), or an application-specific integrated circuit (Application Specific Integrated Circuit, ASIC for short), or one or more integrated circuits configured to implement the embodiments of the present invention.

The processor 61 is configured to implement the communication method in the foregoing embodiment by executing the program code in the memory 62.

The processor 61 is configured to generate an identifier of a current discovery frame of a current discovery time period.

The transmitter 64 is configured to broadcast the identifier, generated by the processor 61, of the current discovery frame of the current discovery time period, so that a terminal that receives the broadcast sent by the base station acquires, according to the identifier, in the broadcast, of the current discovery frame of the current discovery time period, a frequency-time pattern of the current discovery time period or a frequency-time pattern of a discovery time period that is after the current discovery time period.

The identifier of the current discovery frame is used to identify a frequency-time pattern of a discovery time period, and the terminal sends or receives a discovery signal according to the frequency-time pattern of the discovery time period.

The base station sends the identifier of the current discovery frame of the current discovery time period in a broadcast manner, and the terminal that receives the broadcast obtains the frequency-time pattern of the current discovery time period according to the identifier, in the broadcast, of the current discovery frame of the current discovery time period. According to a specific situation, the terminal may further acquire, according to the frequency-time pattern of the current discovery time period, the frequency-time pattern of the discovery time period that is after the current discovery time period, for example, a frequency-time pattern of a next discovery time period of the current discovery time period.

In this embodiment, a base station broadcasts an identifier of a current discovery frame of a current discovery time period, so that a terminal acquires a frequency-time pattern of the current discovery time period according to the identifier of the current discovery frame of the current discovery time period, which resolves a problem in the prior art that the terminal cannot obtain a frequency-time pattern of a discovery time period when an interval between two consecutive discovery time periods is long.

On the basis of the foregoing solution, the processor 61 is specifically configured to:

calculate the identifier of the current discovery frame of the current discovery time period according to a sequence number of the current discovery time period and a cycle period of a discovery frame.

Specifically, the processor 61 calculates the identifier of the current discovery frame of the current discovery time period according to a formula index=t mod N, where index is the identifier of the current discovery frame of the current discovery time period, t is the sequence number of the current discovery time period, N is the cycle period of a discovery frame, and mod is a modulo operation.

In an LTE system, the base station may broadcast the identifier of the current discovery frame of the current discovery time period, and the terminal that receives the broadcast obtains the identifier of the current discovery frame of the current discovery time period from the broadcast. The identifier of the current discovery frame is obtained according to the sequence number of the current discovery time period and a cycle period of the identifier of the current discovery frame, and the terminal obtains the frequency-time pattern of the current discovery time period according to the identifier of the current discovery frame.

Further, on the basis of the foregoing solution, the transmitter 64 is specifically configured to:

send the broadcast before the current discovery time period arrives, where the broadcast includes the identifier, generated by the processor, of the current discovery frame of the current discovery time period; or send the broadcast within the current discovery time period, where the broadcast includes the identifier, generated by the processor, of the current discovery frame of the current discovery time period.

In this solution, a base station sends, by using a broadcast, an identifier of a current discovery frame of a current discovery time period before the current discovery time period arrives or within the current discovery time period, so that a terminal that receives the broadcast may obtain, according to the identifier of the current discovery frame of the current discovery time period, a frequency-time pattern of the current discovery time period or a frequency-time pattern of a discovery time period that is after the current discovery time period.

Optionally, the base station may also send, within some discovery time periods allocated for D2D communication in the LTE system, the broadcast that includes the identifier of the current discovery frame of the current discovery time period. The transmitter 64 is specifically configured to:

send the broadcast before a preset discovery time period arrives, where the broadcast includes the identifier, generated by the processor, of the current discovery frame of the current discovery time period; or send the broadcast within a preset discovery time period, where the broadcast includes the identifier, generated by the processor, of the current discovery frame of the current discovery time period.

The preset discovery time period may include some discovery time periods in discovery time periods allocated for the D2D communication in the LTE system. Specifically, refer to the solutions 1 to 10 in the foregoing embodiment.

In this solution, a base station sends, by using a broadcast, an identifier of a current discovery frame of a current discovery time period before a preset discovery time period arrives or within a preset discovery time period, so that a terminal that receives the broadcast obtains a frequency-time pattern of the current discovery time period according to the identifier, in the broadcast, of the current discovery frame of the current discovery time period.

Figure 7:
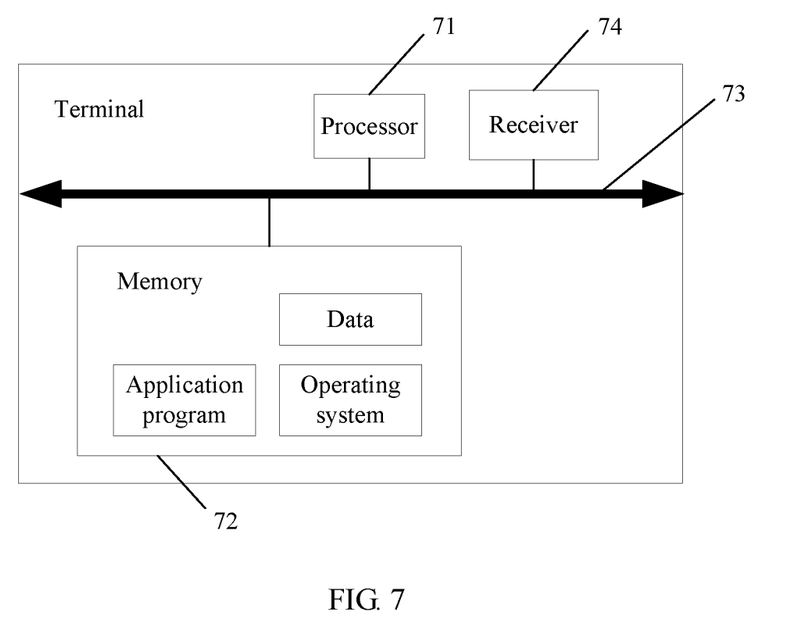
FIG. 7 is a schematic structural diagram of a terminal according to another embodiment of the present invention.

FIG. 7 is a schematic structural diagram of a terminal according to another embodiment of the present invention. The terminal is configured to execute the communication method in the foregoing embodiment. The terminal includes at least one processor 71, a memory 72, a bus 73, and a receiver 74, where the bus 73 is configured to implement connection and communication between the processor 71 and the memory 72, and the memory 72 is configured to store program code that is executed by the processor 71 and data.

The bus 73 may be an industry standard architecture (Industry Standard Architecture, ISA for short) bus, a peripheral component interconnect (Peripheral Component, PCI for short) bus, or an extended industry standard architecture (Extended Industry Standard Architecture, EISA for short) bus, or the like, which is not limited herein. The bus 73 may be categorized into an address bus, a data bus, a control bus, and the like. For ease of denotation, only one thick line is used in FIG. 7 to denote the bus, which, however, does not mean that there is only one bus or only one type of bus.

The memory 72 is configured to store the data or executable program code, where the program code includes a computer operation instruction that may be specifically an operating system, an application program, or the like. The memory 72 may include a high speed RAM memory, or may further include a non-volatile memory (non-volatile memory), for example, at least one magnetic disk storage.

The processor 71 may be a central processing unit (Central Processing Unit, CPU for short), or an application-specific integrated circuit (Application Specific Integrated Circuit, ASIC for short), or one or more integrated circuits configured to implement the embodiments of the present invention.

The processor 71 is configured to implement the communication method in the foregoing embodiment by executing the program code in the memory 72.

The receiver 74 receives a broadcast sent by a base station, and the processor 71 is configured to acquire an identifier of a current discovery frame of a current discovery time period from the broadcast.

The identifier of the current discovery frame is used to identify a frequency-time pattern of a discovery time period, and the terminal sends or receives a discovery signal according to the frequency-time pattern of the discovery time period. The identifier, acquired by the receiver, of the discovery frame of the discovery time period is obtained according to a sequence number of the current discovery time period and a cycle period of a discovery frame. Specifically, refer to the formula (1).

The processor 71 is configured to acquire, according to the identifier of the current discovery frame of the current discovery time period, a frequency-time pattern of the current discovery time period or a frequency-time pattern of a discovery time period that is after the current discovery time period.

In this embodiment, a terminal acquires an identifier of a current discovery frame of a current discovery time period from a broadcast sent by a base station, and obtains, according to the identifier of the current discovery frame, a frequency-time pattern of the current discovery time period or that of a discovery time period that is after the current discovery time period, which resolves a problem in the prior art that the terminal cannot obtain a frequency-time pattern of a discovery time period when an interval between two consecutive discovery time periods is long.

On the basis of the foregoing solution, optionally, the receiver 74 is specifically configured to:

receive, by using the broadcast, the identifier of the current discovery frame of the current discovery time period before the current discovery time period arrives; or receive, by using the broadcast, the identifier of the current discovery frame of the current discovery time period within the current discovery time period.

In this solution, a terminal receives an identifier of a current discovery frame of a current discovery time period before the current discovery time period arrives or within the current discovery time period, and may obtain a frequency-time pattern of the current discovery time period according to the identifier of the current discovery frame.

Further, optionally, if the current discovery time period is a preset discovery time period, the receiver 74 is specifically configured to:

receive, by using the broadcast, the identifier of the current discovery frame of the current discovery time period before the preset discovery time period arrives; or receive, by using the broadcast, the identifier of the current discovery frame of the current discovery time period within the preset discovery time period.

The preset discovery time period may include some discovery time periods in discovery time periods allocated for D2D communication in an LTE system. Specifically, refer to the foregoing solutions 1 to 10.

If the current discovery time period is a discovery time period that is after a preset discovery time period, the receiver 74 is specifically configured to:

calculate, the identifier of the current discovery frame of the current discovery time period according to an identifier of a current discovery frame of the preset discovery time period and a system clock.

The terminal receives the identifier of the current discovery frame of the preset discovery time period, and may calculate, according to the identifier of the current discovery frame of the preset discovery time period and the system clock, an identifier (that is, the identifier of the current discovery frame of the current discovery time period) of a current discovery frame of the discovery time period that is after the preset discovery time period.

In this solution, a terminal receives, by using a broadcast, an identifier of a current discovery frame of a current discovery time period before a preset discovery time period arrives or within a preset discovery time period, and may obtain a frequency-time pattern of the current discovery time period according to the identifier, in the broadcast, of the current discovery frame of the current discovery time period.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A communication method comprising:
   generating, by a base station, an identifier of a current discovery frame of a current discovery time period according to a formula index=t mod N, where index is the identifier, t is a sequence number of the current discovery time period, N is a cycle period of a discovery frame, and mod is a modulo operation;
   generating, by the base station when the current discovery time period is a preset discovery time period, a value of the identifier of the current discovery frame of the current discovery time period for device-to-device (D2D) communication, where the value is a value of (Ak mod N) or (k mod N/A) within or before arrival of a $Ak^{th}$ or a $(Ak+1)^{th}$ discovery time period and k equals an integer, N is an integer greater than 0 of a cycle period of a discovery frame divisible by an integer A that is greater than 0 and mod is a modulo operation;
   using, by the base station, the value as the identifier of the current discovery frame of the current discovery time period; and
   broadcasting, by the base station, the identifier of the current discovery frame of the current discovery time period to a terminal, wherein the identifier corresponds to a frequency-time pattern of the current discovery time period and a frequency-time pattern of a next discovery time period of the current discovery time period,
   wherein the frequency-time pattern of the current discovery time period and the frequency-time pattern of the next discovery time period of the current discovery time period comprises different frequency-time locations for each of a plurality of terminals, with each terminal being assigned a respective time unit and a respective frequency-domain unit.

2. The method according to claim 1, wherein broadcasting the identifier comprises sending, by the base station, a broadcast before or within the current discovery time period, wherein the broadcast comprises the identifier.

3. The method according to claim 1, wherein broadcasting the identifier comprises sending, by the base station, a broadcast before or within the preset discovery time period arrives, wherein the broadcast comprises the identifier.

4. A communication method comprising:
   receiving, by a terminal, a broadcast from a base station, and acquiring an identifier of a current discovery frame of a current discovery time period for device-to-device (D2D) communication from the broadcast, where the identifier is an identifier according to a formula index=t mod N, where index is the identifier, t is a sequence number of a current discovery time period, N is the a cycle period of a discovery frame, and mod is a modulo operation, or when the current discovery time period is a preset discovery time period, the identifier is a value of (Ak mod N) or (k mod N/A) within or before arrival of a $Ak^{th}$ or a $(Ak+1)^{th}$ discovery time period, and k equals an integer, N is an integer greater than 0 of a cycle period of a discovery frame divisible by an integer A that is greater than 0 and mod is a modulo operation; and
   acquiring, by the terminal, according to the identifier, a frequency-time pattern of the current discovery time period and a frequency-time pattern of a next discovery time period of the current discovery time period,
   wherein the frequency-time pattern of the current discovery time period and the frequency-time pattern of the next discovery time period of the current discovery time period comprises different frequency-time locations for each of a plurality of terminals, with each terminal being assigned a respective time unit and a respective frequency-domain unit.

5. The method according to claim 4, wherein receiving the broadcast and acquiring the identifier comprises receiving the identifier before or within the current discovery time period.

6. The method according to claim 4,
wherein in case of the current discovery time period being the preset discovery time period, receiving the broadcast and acquiring the identifier comprises receiving the identifier of the current discovery frame of the current discovery time period before or within the preset discovery time period; or
wherein in case of the current discovery time period being a discovery time period that is after the preset discovery time period, receiving the broadcast and acquiring the identifier comprises calculating, by the terminal, the identifier of the current discovery frame of the current discovery time period according to an identifier of a current discovery frame of the preset discovery time period and a system clock.

7. A base station comprising:
at least one processor;
a memory;
a bus configured to implement connection and communication between the at least one processor and the memory, and the memory is configured to store program code that is executed by the at least one processor and data; and
a transmitter,
wherein, when executing the program code, the at least one processor is configured to generate an identifier of a current discovery frame of a current discovery time period according to a formula index=t mod N, where index is the identifier, t is a sequence number of the current discovery time period, N is a cycle period of a discovery frame, and mod is a modulo operation, or generate, when the current discovery time period is a preset discovery time period, a value of the identifier of the current discovery frame of the current discovery time period for device-to-device (D2D) communication, where the value is a value of (Ak mod N) or (k mod N/A) within or before arrival of a $Ak^{th}$ or a $(Ak+1)^{th}$ discovery time period, where k equals an integer, N is an integer greater than 0 of a cycle period of a discovery frame divisible by an integer A that is greater than 0, wherein mod is a modulo operation, and use the value as the identifier of the current discovery frame of the current discovery time period,
wherein the transmitter is configured to cooperate with the at least one processor to broadcast the identifier to a terminal, wherein the identifier corresponds to a frequency-time pattern of the current discovery time period and a frequency-time pattern of a next discovery time period of the current discovery time period, and
wherein the frequency-time pattern of the current discovery time period and the frequency-time pattern of the next discovery time period of the current discovery time period comprises different frequency-time locations for each of a plurality of terminals, with each terminal being assigned a respective time unit and a respective frequency-domain unit.

8. The base station according to claim 7, wherein the transmitter is further configured to perform the broadcasting before or within the current discovery time period.

9. The base station according to claim 7, wherein the transmitter is further configured to perform the broadcasting before or within the preset discovery time period.

10. A terminal comprising:
at least one processor;
a memory configured to store data and program code that is executed by the at least one processor;
a bus configured to implement a connection and communication between the at least one processor and the memory; and
a receiver configured to receive a broadcast from a base station,
wherein the at least one processor is configured to
acquire an identifier of a current discovery frame of a current discovery time period for device-to-device (D2D) communication from the broadcast, where the identifier is an identifier according to a formula index=t mod N, where index is the identifier, t is a sequence number of a current discovery time period, N is the a cycle period of a discovery frame, and mod is a modulo operation, or when the current discovery time period is a preset discovery time period, the identifier is a value of (Ak mod N) or (k mod N/A) within or before arrival of a $Ak^{th}$ or a $(Ak+1)^{th}$ discovery time period, and k equals an integer, N is an integer greater than 0 of a cycle period of a discovery frame divisible by an integer A that is greater than 0, and mod is a modulo operation, and
acquire, according to the identifier, a frequency-time pattern of the current discovery time period and a frequency-time pattern of a next discovery time period of the current discovery time period, wherein the frequency-time pattern of the current discovery time period and the frequency-time pattern of the next discovery time period of the current discovery time period comprises different frequency-time locations for each of a plurality of terminals, with each terminal being assigned a respective time unit and a respective frequency-domain unit.

11. The terminal according to claim 10, wherein the receiver is further configured to receive the identifier before or within the current discovery time period.

12. The terminal according to claim 10, wherein the receiver is configured to, if the current discovery time period is the preset discovery time period, receive the identifier before or within the preset discovery time period; and
wherein the at least one processor is further configured to, if the current discovery time period is a discovery time period that is after the preset discovery time period, calculate the identifier of the current discovery frame of the current discovery time period according to an identifier of a current discovery frame of the preset discovery time period and a system clock.

* * * * *